United States Patent [19]

Kamijyo

[11] Patent Number: 4,634,630
[45] Date of Patent: Jan. 6, 1987

[54] TELLURIUM OXIDE WHISKERS AND A METHOD OF PRODUCING THE SAME

[75] Inventor: Yoshimi Kamijyo, Furukawa, Japan

[73] Assignee: Alps Electric Co., Ltd., Japan

[21] Appl. No.: 797,641

[22] Filed: Nov. 13, 1985

[30] Foreign Application Priority Data

Nov. 13, 1984 [JP] Japan .................................. 59-239009

[51] Int. Cl.⁴ ............................................. D02G 3/00
[52] U.S. Cl. .................................... 428/399; 428/357; 428/359; 428/364; 428/397; 428/401; 428/402; 423/509
[58] Field of Search ............... 428/364, 397, 399, 401, 428/357, 359, 402; 423/509

[56] References Cited

U.S. PATENT DOCUMENTS

| | | | |
|---|---|---|---|
| 2,793,103 | 5/1957 | Emeis | 423/509 |
| 3,082,099 | 3/1963 | Beasley et al. | 428/401 |
| 3,668,062 | 6/1972 | Shyne et al. | 428/397 |
| 3,808,087 | 4/1974 | Milewski et al. | 428/401 |
| 3,915,660 | 10/1975 | Keller et al. | 428/364 |

*Primary Examiner*—George F. Lesmes
*Assistant Examiner*—S. A. Gibson
*Attorney, Agent, or Firm*—Guy W. Shoup

[57] ABSTRACT

Whiskers comprising needle- or rod-shaped single crystals of tellurium oxide. They are produced by firing metallic tellurium at a temperature of at least 400° C. in an atmosphere containing oxygen.

4 Claims, 2 Drawing Figures

TELLURIUM OXIDE WHISKERS AND A METHOD OF PRODUCING THE SAME

BACKGROUND OF THE INVENTION

1. Field of the Invention

This invention relates to tellurium oxide whiskers and a method of producing the same.

2. Description of the Prior Art

A metal oxide can form crystals in the shape of rods, filaments, needles, flakes, or the like. They are called whiskers. Aluminum oxide ($Al_2O_3$), zinc oxide (ZnO), beryllium oxide (BeO) and magnesium oxide (MgO) are, for example, known as metal oxides which form whiskers. These whiskers are used as a filler for plastics because of their high strength, as well as their special shape as hereinabove mentioned. A study is under way for the possibility of using those whiskers for a variety of other applications.

It is, however, not known that tellurium oxide ($TeO_2$) forms any whisker. Its properties are not clear as yet, either.

SUMMARY OF THE INVENTION

It is an object of this invention to provide a whisker of a tellurium oxide which is expected to be a novel material useful for a variety of industrial applications.

It is another object of this invention to provide a method of producing a whisker of tellurium oxide.

The whiskers of this invention comprise needle- or rod-shaped single crystals of tellurium oxide.

The method of this invention comprises firing metallic tellurium at a temperature of at least 400° C. in an atmosphere containing oxygen.

DETAILED DESCRIPTION OF THE INVENTION

According to the method of this invention, metallic tellurium in the form of, for example, powder or pellets is fired in an atmosphere containing oxygen. The term "atmosphere containing oxygen" as herein used means oxygen itself, or an atmosphere containing oxygen, such as air. The material may, for example, be fired on an alumina substrate, or in an open vessel formed from a heat resistant material, such as a porcelain or quartz crucible. It is fired at a temperature of at least 400° C. It is preferable to employ at least a temperature at which tellurium decreases its weight by sublimation or vaporization as a result of oxidation. Tellurium is oxidized by oxygen in an atmosphere surrounding it when heated at a temperature in the vicinity of its melting point (452° C. to 453° C.), resulting in sublimation or vaporization. The sublimed or vaporized tellurium oxide is considered to form whiskers. The resulting whiskers of tellurium oxide are needle- or rod-shaped single crystals having a diameter of, say, 1 to 20 microns and a length of, say, 0.1 to 1 mm.

Figure 2:
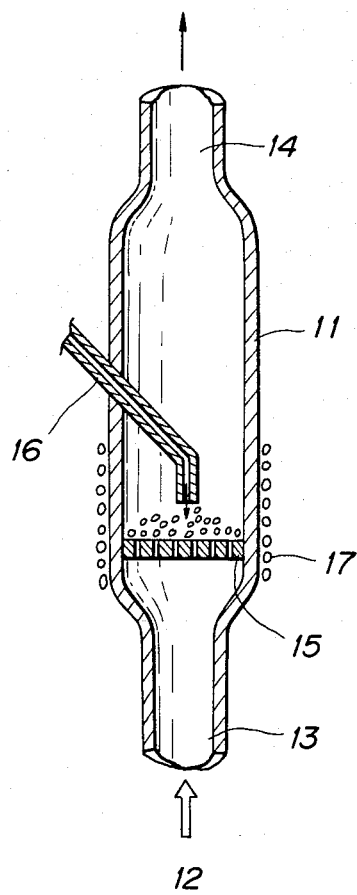
FIG. 2 is a fragmentary longitudinal sectional view of an apparatus which can appropriately be used for carrying out the method of this invention on an industrial basis.

An apparatus which can be used for the industrial production of tellurium oxide whiskers is shown by way of example in FIG. 2. It comprises a quartz tube 11 having an inlet 13 for an oxygen-containing gas 12 at one end and an outlet 14 therefor at the other end. The interior of the tube 11 defines a passage for the gas 12. A porous alumina plate 15 is disposed in the tube 11. A tube 16 for supplying metallic tellurium extends into the quartz tube 11 and has a lower end located above the porous plate 15. An annular heater 17 surrounds the tube 11 in the vicinity of the porous plate 15.

Metallic tellurium in the form of powder, pellets, or the like is supplied onto the porous plate 15 through the tube 16. The oxygen-containing gas 12, which is preheated to a temperature of about 80° C., is blown into the tube 11 through its inlet 13. It leaves the tube 11 after flowing therethrough. The gas 12 is preheated to prevent a temperature drop in the tube 11 and raise the oxidizing efficiency of tellurium. It is, however, not essential to preheat the gas 12.

The heater 17 is turned on to heat the region surrounding the porous plate 15 to a temperature of at least 400° C. As a result, the tellurium is oxidized by the gas 12 and tellurium oxide is continuously sublimed or vaporized. The oxide is carried upward by the gas 12 to form whiskers. The whiskers leaving the outlet 14 are separated from the gas 12 by an appropriate device.

The flow rate of the gas 12 should not be too high, but should be so controlled as to suit the speed at which the whiskers are formed. A flow rate of, say, 0.1 to 10 liters per minute has been experimentally found to be preferable.

The invention will now be described more specifically with reference to several examples thereof.

EXAMPLE 1

One gram of 99.9% purity tellurium pellets having a particle size of about 2 to 3 mm was placed on an alumina substrate and fired at 400° C. for two hours in the air. There were obtained rod-shaped whiskers of tellurium oxide having a diameter not exceeding 10 microns and a length not exceeding 0.3 mm. The whiskers showed a yield of about 5%.

EXAMPLE 2

The procedure of EXAMPLE 1 was repeated, except that the firing temperature was raised to 450° C. There were obtained rod-shaped whiskers of tellurium oxide having a diameter not exceeding 10 microns and a langth not exceeding 0.5 mm. They showed a yield of about 10%.

EXAMPLE 3

Figure 1:
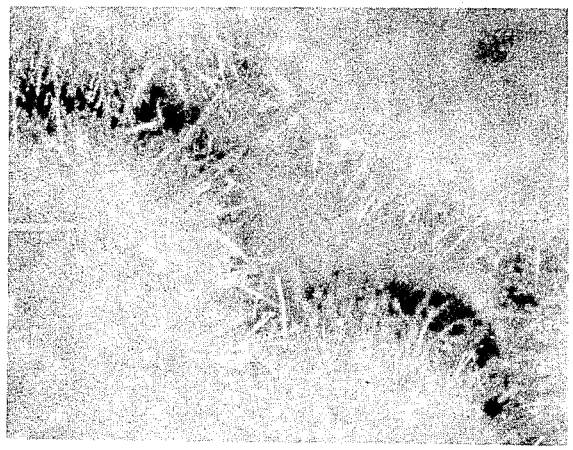
FIG. 1 is a microphotograph of 15 magnifications showing the crystal structure of tellurium oxide whiskers embodying this invention.

The procedure of EXAMPLE 1 was repeated, except that the firing temperature was raised to 500° C., and that the firing time was shortened to an hour. There were obtained needle- or rod-shaped single crystal whiskers of tellurium oxide having a diameter not exceeding 20 microns and a length not exceeding 1 mm. They showed a yield of about 30%. FIG. 1 is a microphotograph of 15 magnifications showing these whiskers.

EXAMPLE 4

The procedure of EXAMPLE 3 was repeated, except that the firing temperature was raised to 600° C. There were obtained rod-shaped whiskers of tellurium oxide having a diameter not exceeding 20 microns and a length not exceeding 1 mm. They showed a yield of about 40%.

EXAMPLE 5

One gram of 99.9% purity tellurium powder having a grain size of about one micron was placed on an alumina substrate and fired at 400° C., 500° C. and 600° C. in the air. Rod-shaped whiskers of tellurium oxide were obtained at all of these firing temperatures.

All of the whiskers obtained in EXAMPLES 1 to 5 were found by X-ray diffraction to be of tellurium oxide.

What is claimed is:
1. A whisker comprising a needle-shaped single crystal of tellurium oxide.
2. A whisker comprising a rod-shaped single crystal of tellurium oxide.
3. A whisker as set forth in claim 1, wherein said crystal has a diameter of about 1 to about 20 microns and a length of about 0.1 to about 1 mm.
4. A whisker, as set forth in claim 2, wherein said crystal has a diameter of about 1 to about 20 microns and a length of about 0.1 to about 1 mm.

* * * * *